(12) United States Patent
Azem et al.

(10) Patent No.: US 9,060,028 B1
(45) Date of Patent: Jun. 16, 2015

(54) METHOD AND APPARATUS FOR REJECTING UNTRUSTED NETWORK

(75) Inventors: Khaled Azem, Sterling, VA (US); Kumi Easwarachandran, Rockville, MD (US)

(73) Assignee: Sprint Spectrum L.P., Overland Park, KS (US)

( * ) Notice: Subject to any disclaimer, the term of this patent is extended or adjusted under 35 U.S.C. 154(b) by 519 days.

(21) Appl. No.: 13/363,762

(22) Filed: Feb. 1, 2012

(51) Int. Cl.
*H04L 29/06* (2006.01)

(52) U.S. Cl.
CPC .............. *H04L 63/205* (2013.01); *H04L 63/16* (2013.01)

(58) Field of Classification Search
CPC ....... H04L 63/205; H04L 63/20; H04L 63/16; H04L 69/24
USPC .............................................................. 726/3
See application file for complete search history.

(56) References Cited

U.S. PATENT DOCUMENTS

| | | | |
|---|---|---|---|
| 2005/0215241 A1* | 9/2005 | Okada | 455/414.1 |
| 2008/0095067 A1 | 4/2008 | Rao | |
| 2008/0313710 A1* | 12/2008 | Doi et al. | 726/3 |
| 2009/0042569 A1* | 2/2009 | Shaheen | 455/435.2 |
| 2009/0257399 A1* | 10/2009 | Kuo | 370/331 |
| 2009/0320100 A1* | 12/2009 | Kitazoe | 726/3 |
| 2010/0011215 A1 | 1/2010 | Lior et al. | |
| 2010/0049969 A1 | 2/2010 | Shon | |
| 2012/0020231 A1* | 1/2012 | Chen et al. | 370/252 |
| 2012/0039464 A1* | 2/2012 | Xu et al. | 380/28 |
| 2012/0094667 A1* | 4/2012 | Nishida et al. | 455/435.1 |
| 2012/0308007 A1* | 12/2012 | Li et al. | 380/270 |
| 2013/0005387 A1* | 1/2013 | Aso et al. | 455/517 |
| 2013/0208694 A1* | 8/2013 | Park et al. | 370/329 |
| 2013/0231120 A1* | 9/2013 | Koc et al. | 455/450 |

OTHER PUBLICATIONS

"Registration," ComputerUser.com, 2 pages.*
3GPP TS 24.301, 3GPP, Sep. 2011, 323 pages.*
3GPP TS 33.401, 3GPP, Jun. 2011, 115 pages.*

* cited by examiner

*Primary Examiner* — Chau Le

(57) ABSTRACT

A method of accessing a communication system and a communication device for performing the same are disclosed. The method includes transmitting, by the communication device to a node of the communication system through a communication link between the communication device and the node, a registration request to register with the communication system, transmitting, by the communication device to the node, a request to disconnect the communication link, when receiving from the communication system a registration response in response to the registration request before receiving an authentication request from the communication system.

8 Claims, 10 Drawing Sheets

METHOD AND APPARATUS FOR REJECTING UNTRUSTED NETWORK

TECHNICAL BACKGROUND

Wireless communication systems have become an important means by which many people worldwide have come to communicate. A wireless communication system may provide communication for a plurality of wireless devices, each of which may be serviced through one or more access nodes of the communication system.

When accessing the wireless communication system, a wireless device may be required to perform one or more processes, including but not limited to, synchronization, ranging, authentication, authorization and registration. If one or more messages related to the completion of one or more of these procedures are not received by the intended recipient, or are received by the intended recipient out of order, the wireless device and/or the wireless communication system may be exposed to unauthorized use or access.

OVERVIEW

A method of accessing a communication system is disclosed. The method includes transmitting, by the communication device to a node of the communication system through a communication link between the communication device and the node, a registration request to register with the communication system, transmitting, by the communication device to the node, a request to disconnect the communication link, when receiving from the communication system a registration response in response to the registration request before receiving an authentication request from the communication system.

A communication device is disclosed. The communication device includes a communication interface unit for communicating with a communication system over a connection link between the communication interface and a node of the communication system, a storage unit, and a processor coupled to the communication interface and the storage unit configured to transmit, to the node, a registration request to register with the communication system, and transmit, to the node, a request to disconnect the communication link, when receiving from the communication system a registration response in response to the registration request before receiving an authentication request from the communication system.

DETAILED DESCRIPTION

The foregoing general description, the following detailed description, and the accompanying drawings, are exemplary and explanatory only and are not restrictive of the present teachings, as claimed. The following detailed description and accompanying drawings set forth the best mode of the present teachings. For the purpose of teaching inventive principles, some aspects of the best mode may be simplified or omitted where they would be known to those of ordinary skill in the art.

The appended claims specify the scope of the present teachings. Some aspects of the best mode may not fall within the scope of the present teachings as specified by the claims. Thus, those skilled in the art will appreciate variations from the best mode that fall within the scope of the present teachings. Those skilled in the art will also appreciate that the features described below can be combined in various ways to form multiple variations of the present teachings. As a result, the present teachings are not limited to the specific examples described below, but only by the claims and their equivalents.

Figure 1:
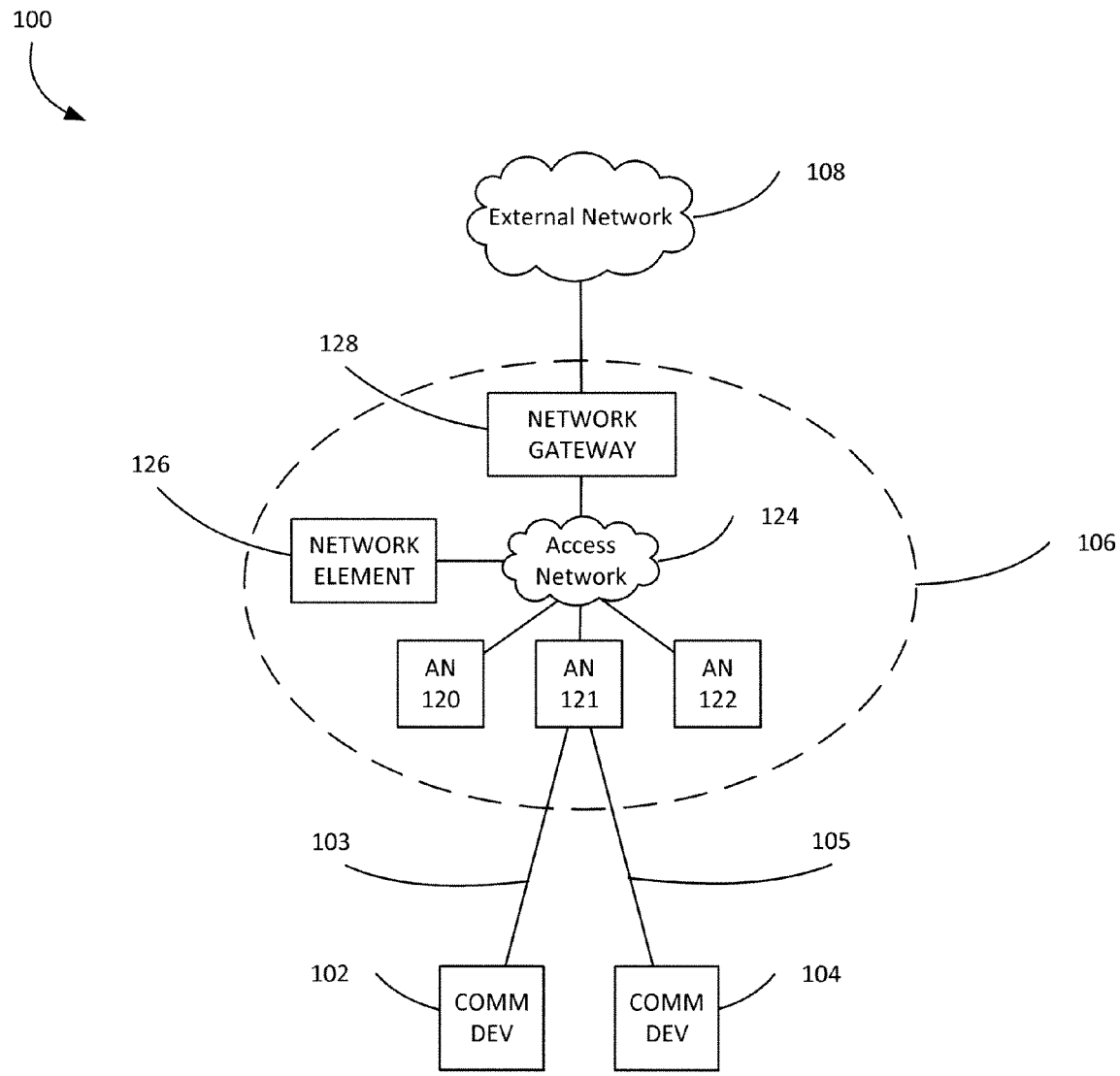
FIG. 1 includes a schematic diagram of an exemplary embodiment of the present teachings.

FIG. 1 illustrates communication environment 100 depicting certain aspects of the present teachings. Communication environment 100 comprises communication devices 102 and 104, communication system 106, and external network 108. Communication system 106 comprises access nodes 120-122, access network 124, network element 126, and network gateway 128.

Communication system 106 provides wireless communication services to communication devices 102 and 104, and may be implemented using one or more wireless communication protocols, such as integrated Digital Enhanced Network (iDEN), Code Division Multiple Access (CDMA), Evolution Data Only (EVDO), Worldwide Interoperability for Microwave Access (WiMAX), Global System for Mobile Communication (GSM), Long Term Evolution (LTE), Wireless Fidelity (WIFI), High Speed Packet Access (HSPA), or some other communication format. Communication system 106 may provide half-duplex voice service, full-duplex voice service, and/or circuit switch/packet data service to communication devices 102 and 104.

Communication devices 102 and 104 may include any electronic device that may be used for voice and/or data communication over a wireless communication system. Examples of communication devices 102 and 104 include, but are not limited to, cellular phones, smart phones, personal digital assistants (PDAs), handheld devices, wireless modems, laptop computers, and personal computers.

Communication devices 102 and 104 may communicate with access node 106 over wireless links 103 and 105, respectively. Wireless links 103 and 105 may use the air or space as their transport media and may carry data using various protocols, such as iDEN, CDMA, EVDO, WiMAX, GSM, LTE, WIFI, HSPA, or some other wireless communication format. Communication devices 102 and 104 may be subscribers of communication system 106 or may be subscribers of another communication system (not shown) and capable of roaming into (and being served by) communication system 106.

An access node of access nodes 120-122 may include an access node radio and control equipment contained in a base station (BS), or cell site. However, an access node according to the present teachings is not so limited and may be configured differently. Although, for simplicity, communication system 106 is shown as including three access nodes (120-122), those of ordinary skill in the art will appreciate that communication system 106 may include more or less access nodes.

An access node of access nodes 120-122 may be used to provide a link between communication system 106 and communication devices 102 and 104, and may further provide connectivity between communication devices 102 and 104 and external network 108. The external network 108 may be the Internet, a wide area network (WAN), a local area network (LAN), an intranet, another carrier network, or some other type of communications network.

Connectivity between elements of communication system 106 is depicted for simplicity as internal network 124, but the present teachings are not so limited, and communication between elements of communication system 106 may include direct links, or intermediate networks, systems, or devices. Connectivity between the elements of communication system 106 may include links comprising metal, glass, air, space, or some other material as the transport media and communication therein may be realized through communication protocols such as Internet Protocol (IP), Ethernet, or some other communication format—including combinations thereof. Internal network 124 may comprise a router, a computer system, or any other element capable of interconnecting multiple devices.

Network element 126 may provide functionality to authenticate communication devices 102 and 104. Although Network element 126 is illustrated as a stand-alone element, its functionality may be integrated in one or more other elements of communication system 106.

Network gateway 128 may be any element which provides a gateway between the internal network 124 and an external network 108. Network gateway 128 may aggregate subscriber and control traffic from access nodes within a communication system, provide subscriber management functions, perform network optimization, and forward subscriber traffic as necessary.

Figure 2:
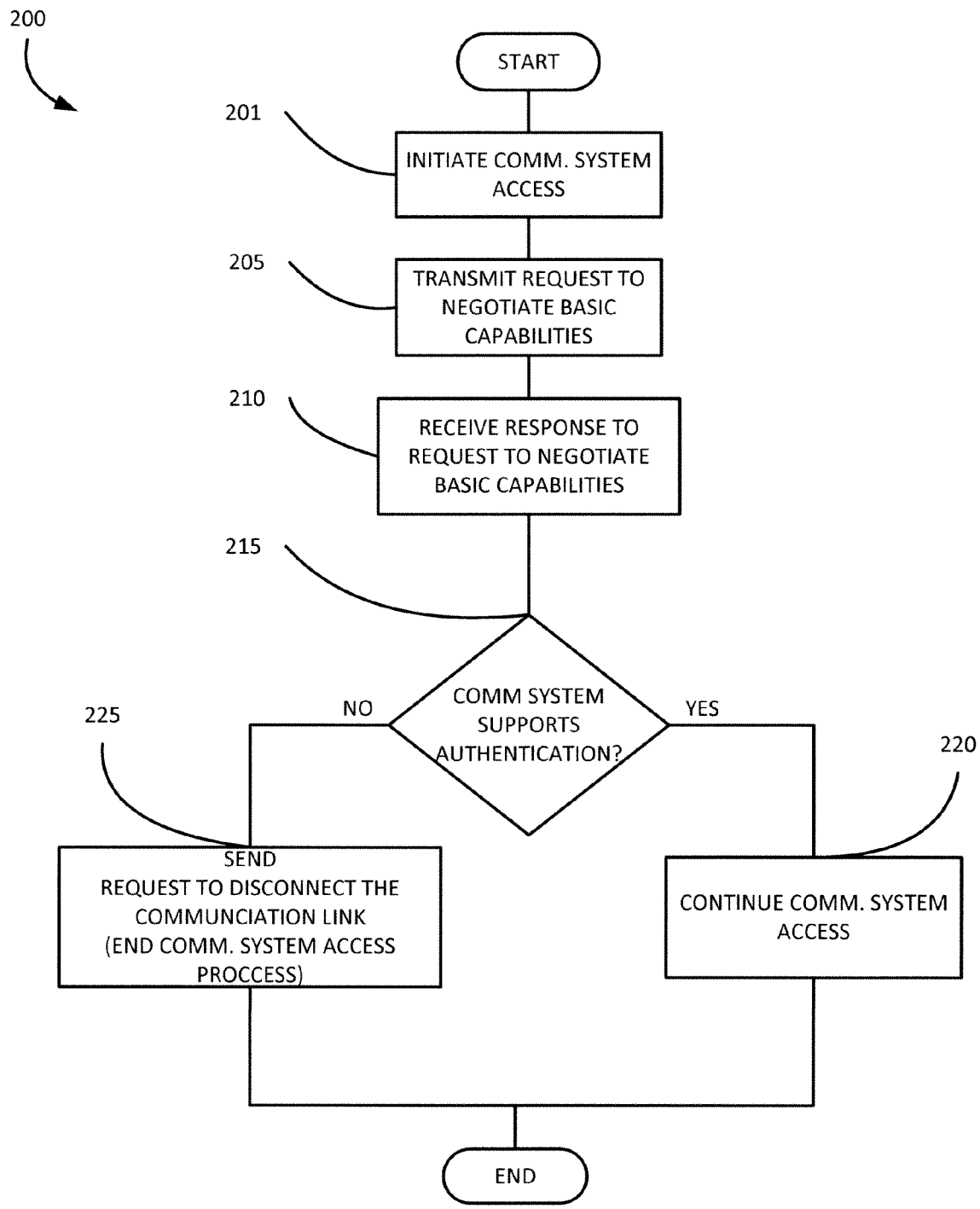
FIG. 2 includes a flowchart illustrating a process according to an exemplary embodiment of the present teachings.

FIG. 2 illustrates a process 200 according to an exemplary embodiment for operating communication device 102. At step 201, a communication device 102 initiates the process of accessing communication system 106. At step 205, communication device 102 transmits a request to negotiate basic capabilities to communication system 106. At step 210, communication system 106 sends a response to the request to negotiate basic capabilities. At step 215, communication device 102 determines if communication system 106 supports authentication.

If communication system 106 supports authentication, communication device 102 continue the process of accessing communication system 106 (step 220). However, if communication system 106 does not support authentication, communication device 102 sends a request to disconnect from the communication system 106 to terminate the entry attempt (step 225).

Thus, a communication device according to the present teachings will detect when a communication system does not support authentication and terminate communications accordingly.

In an exemplary embodiment, communication system 106 operates in accordance with WiMAX communication technology. Accordingly, network gateway 128 may be realized by an access service network (ASN) gateway, network element 126 may be realized by an authentication, authorization, and accounting (AAA) server, and access nodes 120-124 may be realized by base stations (BS), but, as noted above, the present teachings are not so limited.

As will be further explained below, current implementations of WiMAX communication technology may expose a communication device accessing a WiMAX system to security and/or privacy-related attacks due to a vulnerability in WiMAX's network access procedures. An exemplary embodiment of the present teachings will obviate the effects of this vulnerability by detecting the events that may cause the communication device to be exposed to the vulnerability and terminating communications accordingly.

In WiMAX, privacy and authentication are provided across the communication system by its security sublayer. The BS protects against unauthorized access to services by securing associated service flows across the network through an authenticated client/server key management protocol (Privacy Key Management (PKM)). To enforce conditional access to network services, the protocol uses either extensible authentication protocol (EAP) or X.509 digital certificates together with RSA public-key encryption algorithm or a sequence starting with RSA authentication and followed by EAP authentication.

There are two PKM protocols supported in WiMAX: PKM version 1 (PKMv1) and PKM version 2 (PKMv2), which includes more enhanced features than PKMv1. The description below is based on the use of PKM protocol PKMv2, but the present teachings may not be so limited.

Figure 3:
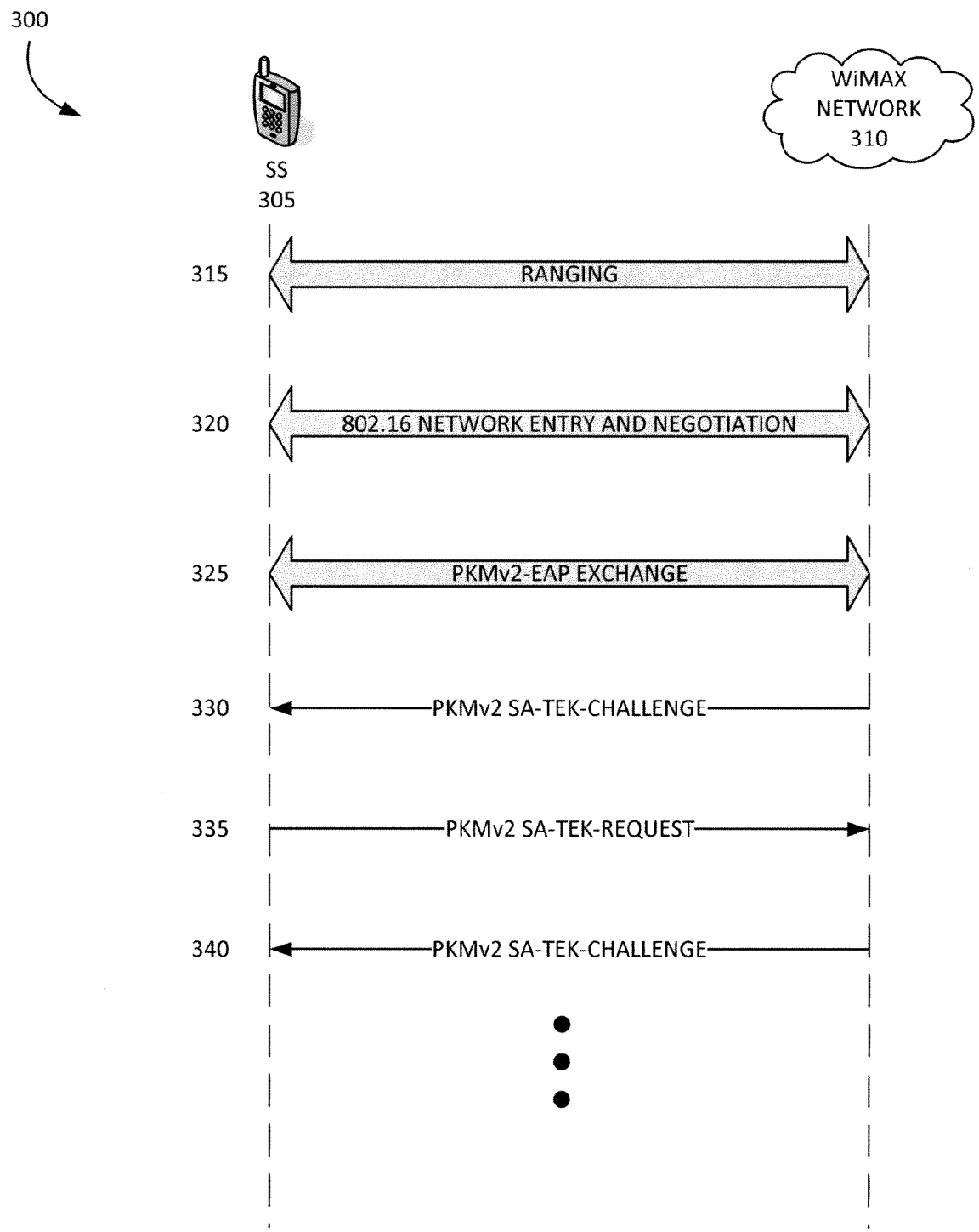
FIG. 3 includes a message sequence chart illustrating a network access process.

FIG. 3 depicts a message sequence chart 300 illustrating some of the PKMv2 procedures followed after initial network entry before a service flow can be set up between communication device (referred to in the WiMAX specification as subscriber station, or SS) 305 and WiMAX network 310. Messages 315 are directed to a WiMAX ranging process. Messages 320 are directed to negotiation of security capabilities and authorization policy, which includes subscriber station basic capability request and response (SBC REQ/RSP) messages. Messages 325 include an EAP exchange of messages for authentication of SS 305. After authentication, the WiMAX network initiates the transfer of security associations (SA) for secure communications, which is performed via a PKMv2 SA-traffic encryption key (TEK) 3-way handshake. First, the WiMAX network 310 sends message 335, which identifies an authorization key (AK) to be used for the SA, and includes a unique challenge. Second, SS 305 sends message 335 to request SA descriptors identifying the SAs the requesting SS is authorized to access and their particular properties. Third, WiMAX network 310 sends message 340 to identify and describe the primary and static SAs the requesting SS is authorized to access.

In current implementations of WiMAX, if an SS had been in the midst of an EAP exchange of messages and had been awaiting notification of completion of the exchange through PKMv2 EAP Transfer with EAP-Success, or PKMv2 Authenticated EAP Transfer with EAP-Success, and the SS instead receives the PKMv2 SA-TEK-Challenge, the SS treats the SA-TEKChallenge as receipt of PKMv2 EAP Transfer with EAP-Success, or PKMv2 Authenticated EAP Transfer with EAP-Success, and then processes the SA-TEK-Challenge as if it had received the message after normally receiving the preceding PKMv2 EAP Transfer with EAP-Success, or PKMv2 Authenticated EAP Transfer with EAP-Success. This may expose the SS to having access to an un-trusted WiMAX network.

Figure 4:
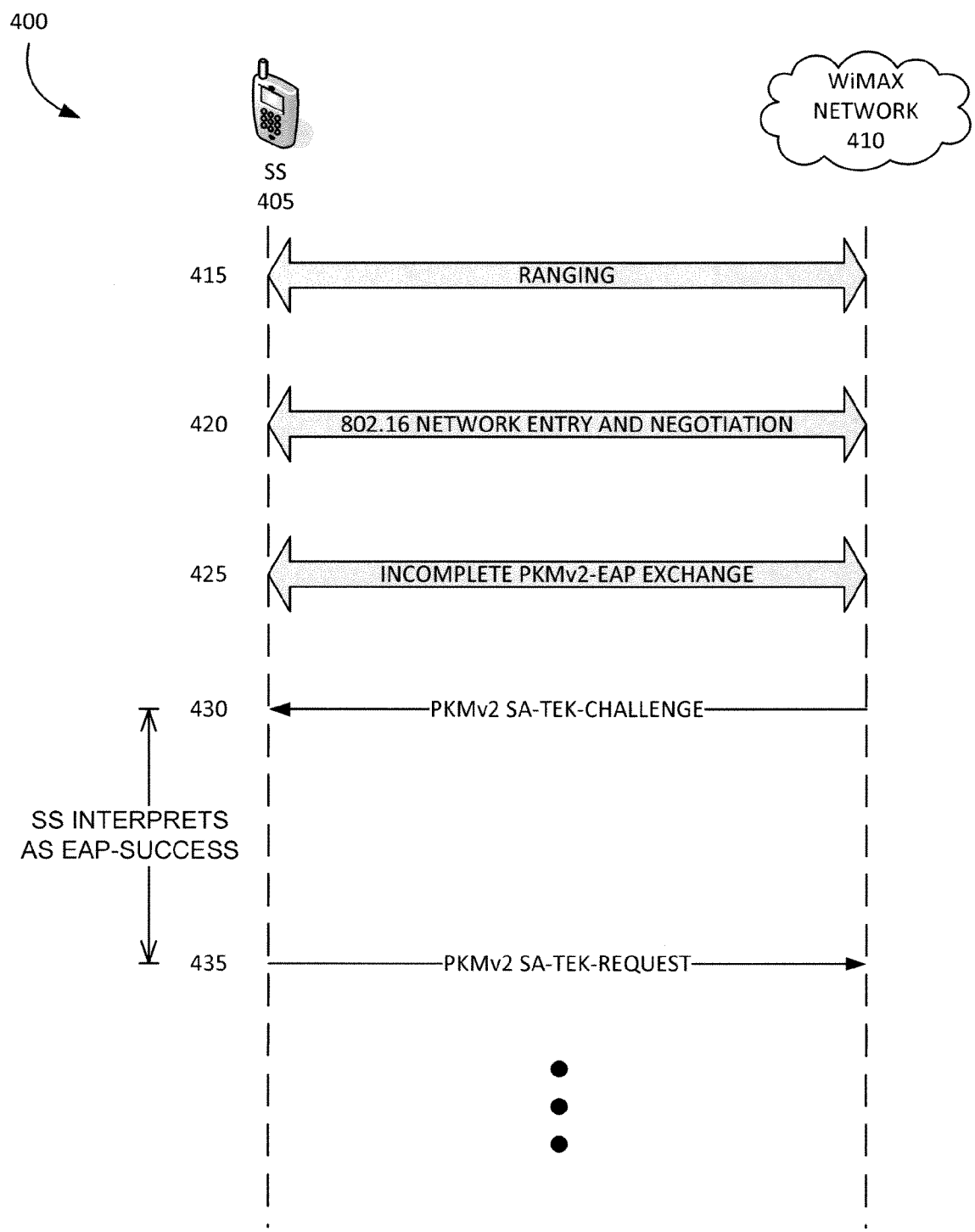
FIG. 4 includes a message sequence chart illustrating another network access process.

FIG. 4 depicts a message sequence chart 400 illustrating messages between a SS 405 and a WiMAX network 410 illustrating the above-noted vulnerability. Messages 415 are directed to a WiMAX ranging process. Messages 420 are directed to a negotiation of security capabilities and authorization policy, which includes SBC REQ/RSP messages. Messages 425 include an incomplete EAP exchange of messages for authentication of SS 405. During/after incomplete EAP exchange, the WiMAX network initiates the PKMv2 SA-TEK 3-way handshake with message 430, which identifies an AK to be used for the SA, and includes a unique challenge. Although an EAP exchange is incomplete, SS 405 treats the SA-TEKChallenge as receipt of PKMv2 EAP Transfer with EAP-Success, or PKMv2 Authenticated EAP Transfer with EAP-Success, and then processes the SA-EAP Transfer with EAP-Success, or PKMv2 Authenticated EAP Transfer with EAP-Success (i.e., sending the PKMv2 SA-TEK message 435). If these access-related processes complete and the SS obtains access to the network, SS 405 may be vulnerable to security or privacy-related attacks due to being connected to an un-trusted WiMAX network.

Figure 5:
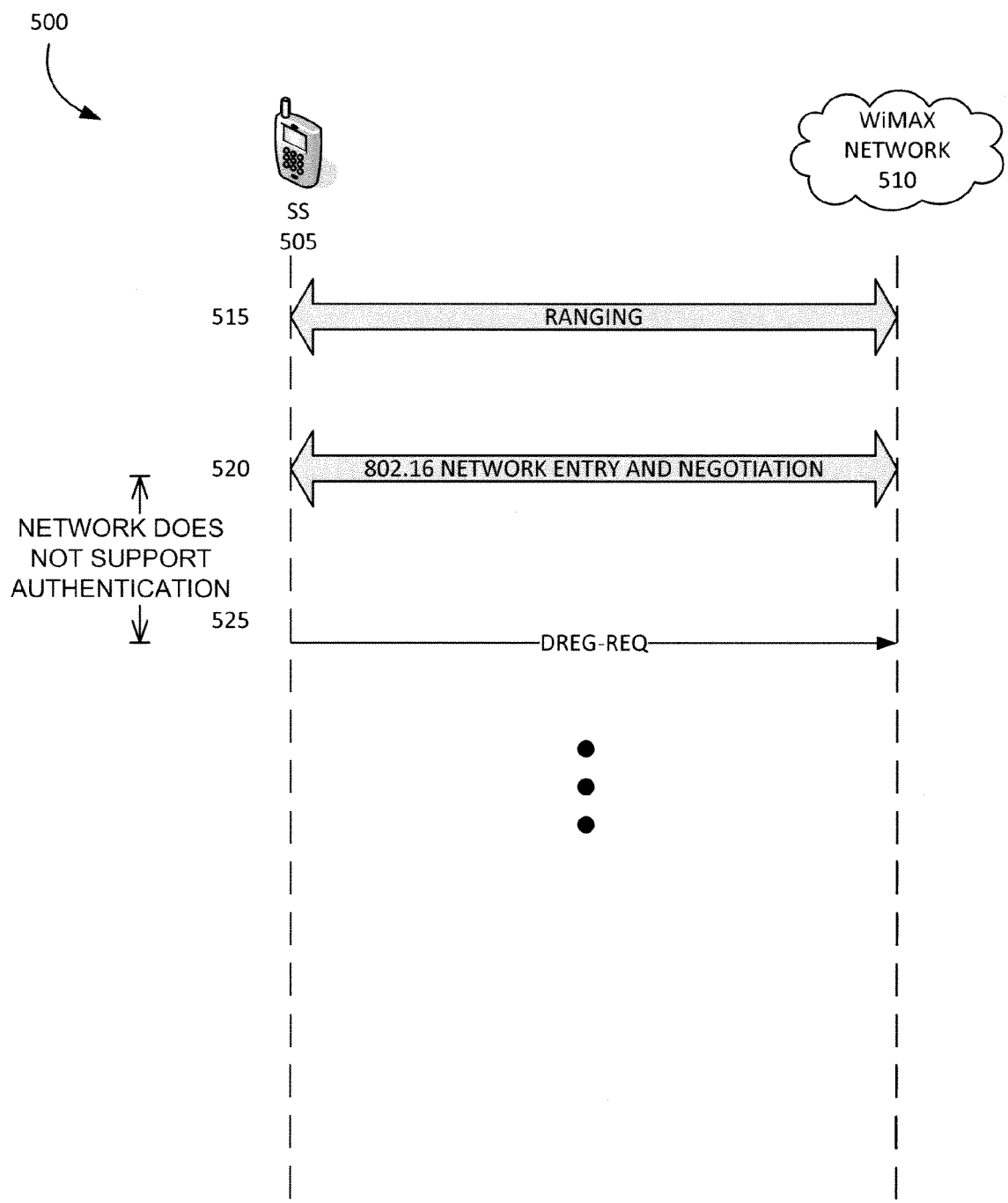
FIG. 5 includes a message sequence chart illustrating a process according to an exemplary embodiment of the present teachings.

FIG. 5 depicts a message sequence chart 500 illustrating messages between a SS 505 according to an exemplary embodiment of the present teachings and a WiMAX network 510. Messages 515 are directed to a WiMAX ranging process. Messages 520 are directed to a negotiation of security capabilities and authorization policy, which includes SBC REQ/RSP messages. From messages 520 the SS 505 determines that WiMAX network 510 does not support authentication. Because WiMAX network 510 does not support authentication, SS 505 sends a DREG-REQ to the WiMAX network 510 and terminates the entry attempt.

Thus, a communication device according to the present teachings will obviate the effects of the above-noted vulnerability by detecting events that may cause the communication device to be exposed to the vulnerability and terminating communications accordingly.

Figure 6:
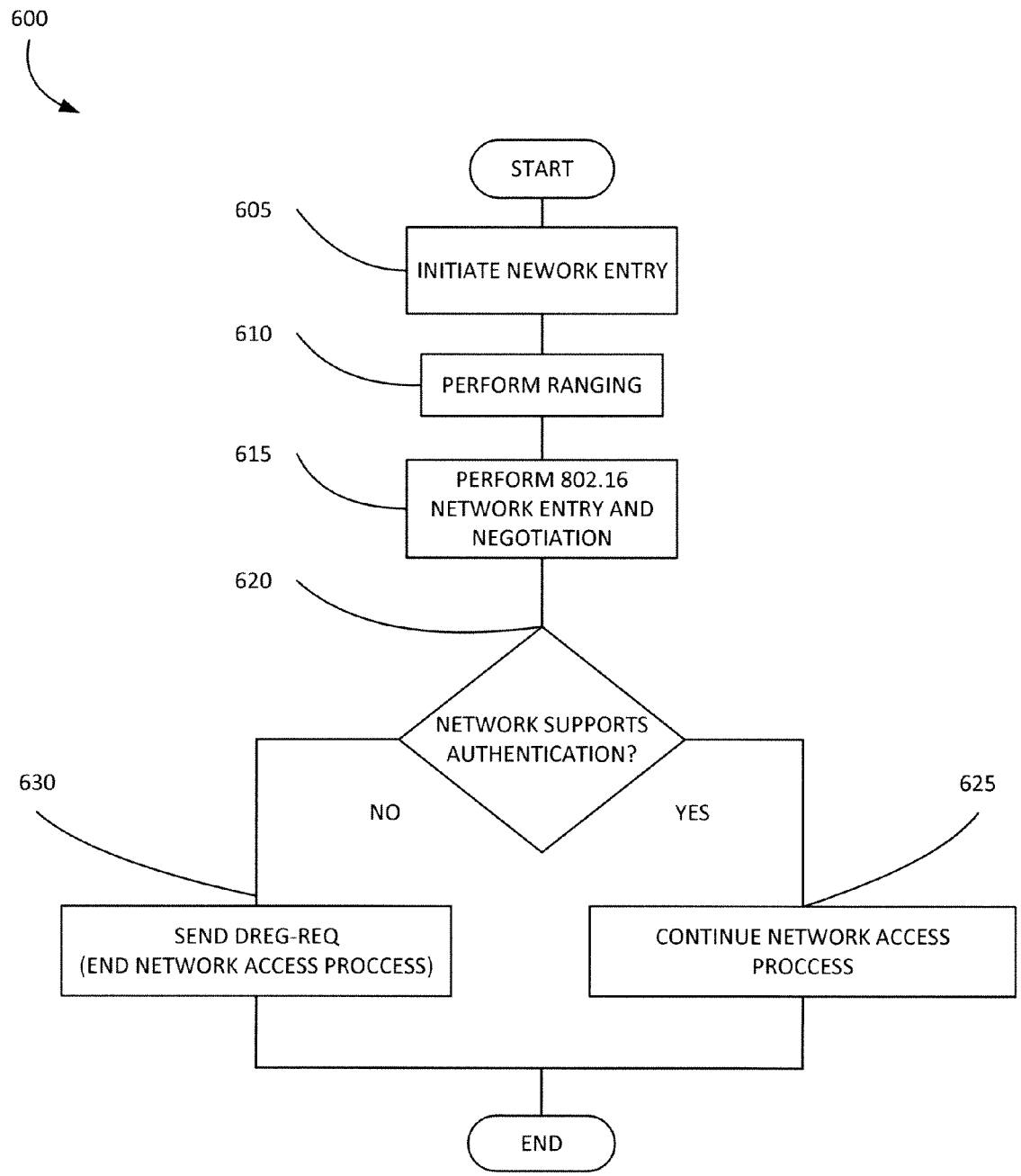
FIG. 6 includes a flowchart illustrating a process according to an exemplary embodiment of the present teachings.

FIG. 6 illustrates a process 600 according to an exemplary embodiment for operating a communication device, such as FIG. 1's device 102 within a communication system such as FIG. 1's communication system 100. At step 605, communication device 102 initiates entry into WiMAX network 106. At step 610, communication device 102 performs ranging process with WiMAX network 106. At step 615, communication device 102 performs negotiation of security capabilities and authorization policy with WiMAX network 106, which includes SBC REQ/RSP messages. From the SBC REQ/RSP messages the communication device 102 determines whether WiMAX network 106 supports authentication (step 620).

If WiMAX network 106 supports authentication, the network access process continues (step 625). However, if WiMAX network 106 does not support authentication, communication device 102 sends a DREG-REQ to network 106 to terminate the entry attempt (step 630).

Thus, a communication device according to the present teachings will obviate the effects of the above-noted vulnerability of the WiMAX communication technology by detecting the events that may cause the communication device to be exposed to the vulnerability and terminating communications accordingly.

In another exemplary embodiment, communication system 106 operates in accordance with LTE communication technology. Accordingly, network gateway 128 may be realized by a mobility management entity (MME), network element 126 may be realized by a home subscriber server (HSS), and access nodes 120-124 may be realized by evolved node B (eNB) stations, but, as noted above, the present teachings are not no limited.

As will be explained below, current implementations of LTE communication technology may expose a device accessing an LTE communication system to security and/or privacy-related attacks when certain steps of the LTE access procedure are not followed, or not followed in an appropriate order. An exemplary embodiment of the present teachings may prevent some of these attacks by detecting events which may cause the device to be exposed to these attacks and terminating communications accordingly.

In LTE, a device seeking to access a communication system would first search for a suitable network and would attempt to register. Once the device finds a suitable network it performs an attach procedure, which begins with a radio resource control (RRC) connection establishment. Once the RRC connection is complete (as signaled by the device sending an RRC Connection Setup Complete message to the network's eNB element), an attach request is forwarded automatically from the eNB to the networks' mobility management entity (MME).

During the attach procedure, an identification procedure takes place to identify the device to the network followed by an authentication procedure. If from the RRC connection establishment process/attach request message the eNB can successfully complete a device identification process with the MME, or if a direct identification request/process between the device and the MME completes successfully, an authentication process may be omitted. On the other hand, if an identification request/process is not successfully completed (e.g., no context for the device exists anywhere in the system), authentication/security procedures are mandatory.

Figure 7:
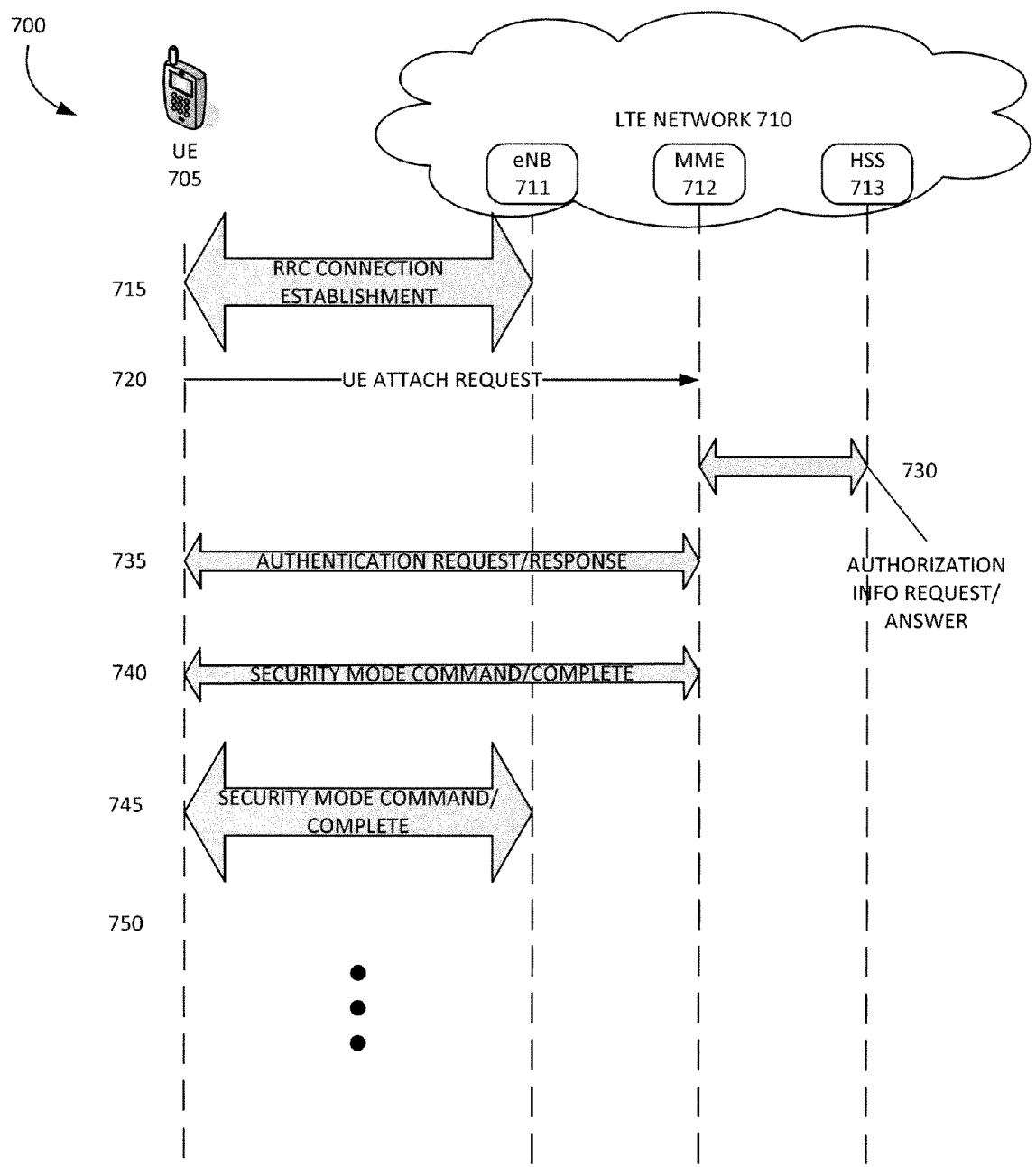
FIG. 7 includes a message sequence chart illustrating yet another network access process.

FIG. 7 depicts a message sequence chart 700 illustrating some elements of an LTE system access procedure between a device (referred to in the LTE specification as a user equipment, or UE) 705 and elements of an LTE communication network 710. Messages 715 are directed to an RRC connection establishment between UE 705 and eNB 711 of LTE network 710. After RRC connection establishment, MME 712 of the LTE network 710 receives an UE attach request or UE combined attach request 720 from UE 705.

Messages 730 are directed to an authentication process for authenticating the identified UE 705 based on information obtained from HSS 713. Messages 730 may be exchanged when MME 712 does not contain context for the identified UE 705 and was unable to identify another MME within the network containing context for the identified UE 705. When such context is found by MME 712, message exchange 730 may not be necessary for authentication. Messages 735 are directed to an authentication process for authenticating the UE 705 based on an information exchange between MME 712 and UE 705. Messages 740 are directed to signaling plane security commands between UE 705 and MME 712 and messages 745 are directed to user plane security commands between UE 705 and eNB 711.

In current implementations of LTE the authentication of an UE is mandatory only under certain conditions and optional when, for example, the network finds context info anon for the UE either within the present MME, another MME, or within the HSS.

Figure 8:
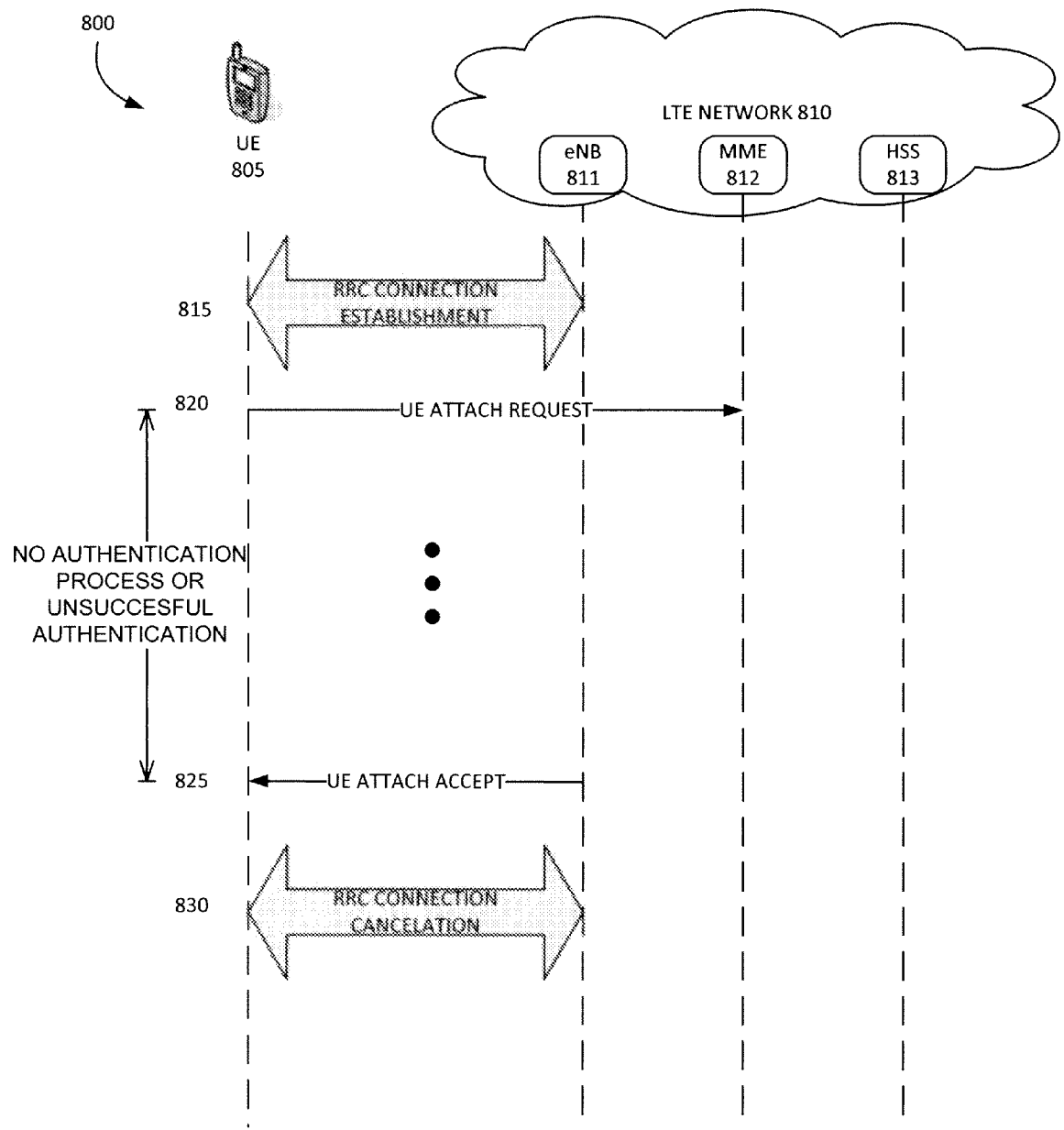
FIG. 8 includes a message sequence chart illustrating a process according to an exemplary embodiment of the present teachings.

FIG. 8 depicts a message sequence chart 800 illustrating messages between a UE 805 according to an exemplary embodiment of the present teachings and an LTE network 810. Messages 815 are directed to an RRC connection establishment between UE 805 and eNB 811 of LTE network 810. After RRC connection establishment, MME 812 of the LTE network 810 receives an UE attach request or UE combined attach request 820 from UE 805. eNB 811 sends message UE attach accept message 825 to UE 805 to complete the attach procedure prior to completing successfully an authentication process.

In this case, because the authentication request/response did not take place, UE 805 initiates RRC connection cancellation procedures 830. The RRC connection cancellation procedures 830 may include the "network failing authentication check" procedures described in LTE's technical specification section 24.301, subclause 5.4.2.7, item f (3GPP TS 24.301 v8.1.0 (2009-03), which is incorporated herein in its entirety). Thus, a communication device according to the present teachings may obviate exposure to the above-noted attacks by detecting events that may cause the communication device to be exposed to attacks and terminating communications accordingly.

The present teachings are not limited to the embodiment depicted in FIG. 8, and a UE according to the present teachings may cancel a connection with an LTE network based on several combinations of exchanges which may lead the UE to be granted access to the LTE network without proper authentication.

Figure 9:
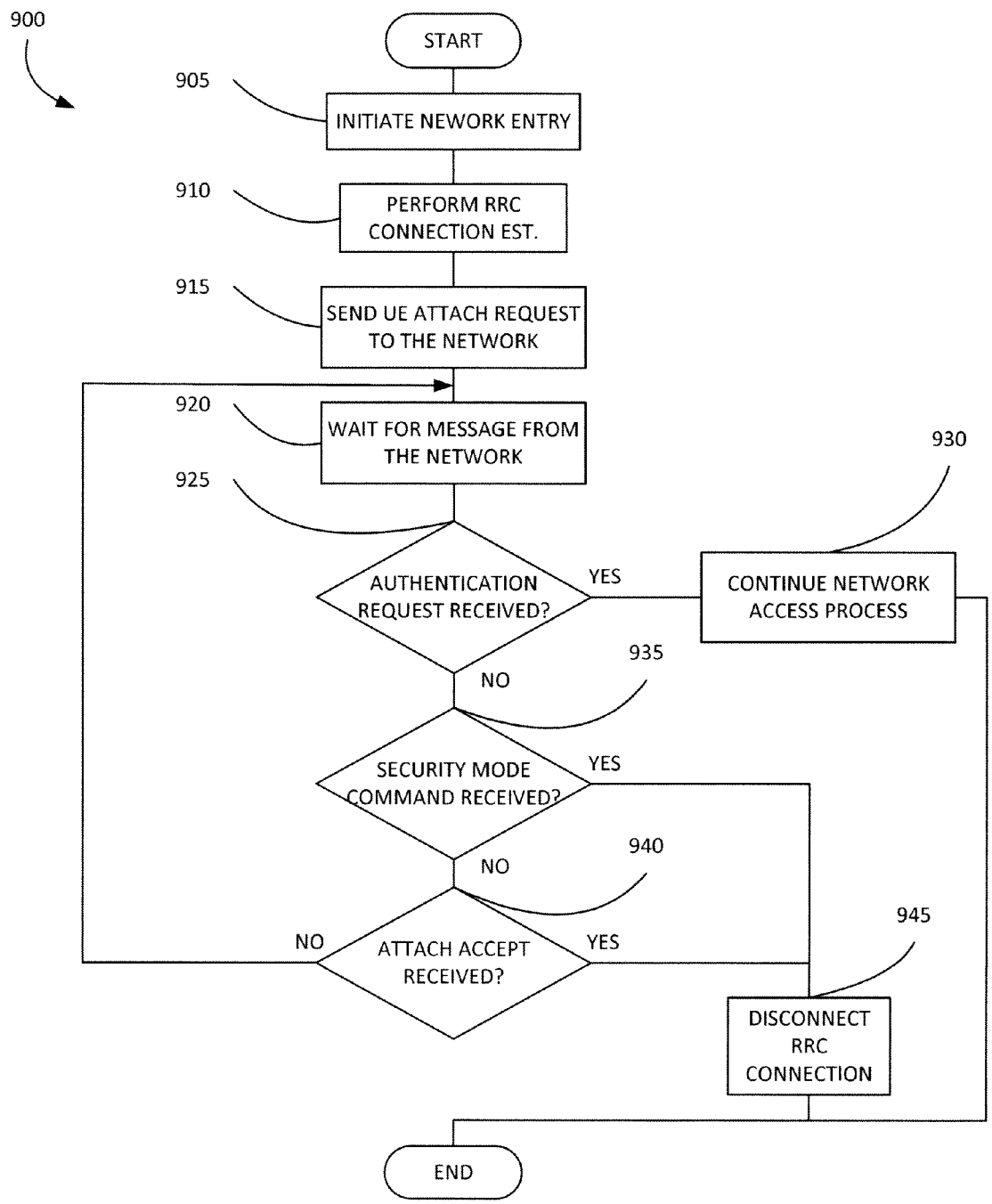
FIG. 9 includes a flowchart illustrating a process according to an exemplary embodiment of the present teachings.
Figure 10:
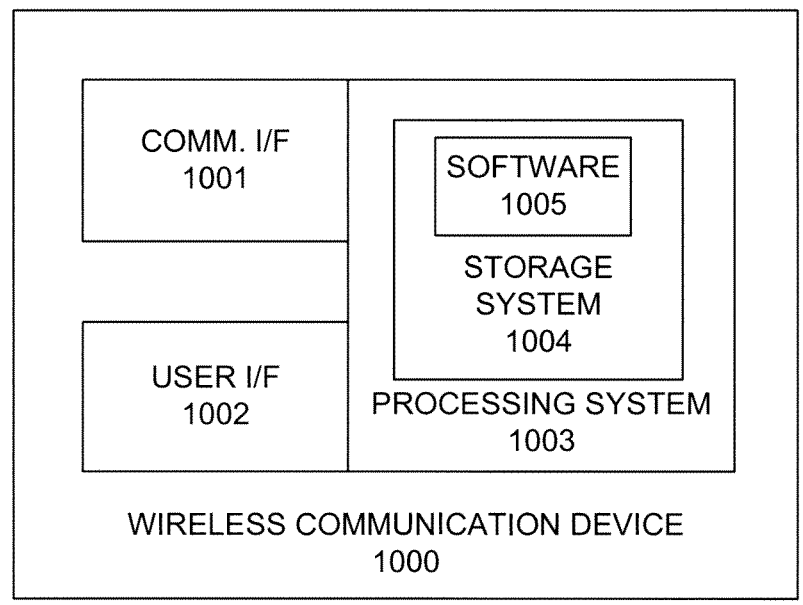
FIG. 10 includes a communication device according to an exemplary embodiment of the present teachings.

FIG. 9 illustrates a process 900 according to an exemplary embodiment for operating a UE, such as FIG. 1's device 102 within a communication system such as FIG. 1's communication system 100. At step 905, UE 102 initiates entry into LTE network 106. At step 910, UE 102 establishes RRC connection with LTE network 106. At step 915, UE 102 sends UE attach request to LTE network 106 and waits for messages from LTE network 106. At step 920 UE 102 waits for a message from LTE network 106.

At step 925 UE 102 determines whether a received message is an authentication request. When the message is an authentication request the network access process continues (step 930). When the message is not an authentication request, but a security mode command (Non-access stratum (NAS) layer security mode command or RRC layer security mode command) (step 935) or an attach accept message (step 940), UE 102 initiates an RRC disconnection with LTE network 106 (step 945). Thus, a communication device according to the present teachings may obviate exposure to the above-noted attacks by detecting events that may cause the communication device to be exposed to attacks and terminating communications accordingly.

FIG. 11 illustrates wireless communication device 1100. Wireless communication device 1100 is an example of wireless communication device 102, although a person of ordinary skill in the art would recognize that a wireless communication device according to the present teachings may be configured differently. Wireless communication device 1100 comprises wireless communication interface 1101, user interface 1102, and processing system 1103. Processing system 1103 is linked to wireless communication interface 1101 and user interface 1102. Processing system 1103 includes processing circuitry and storage system 1104 that stores software 1105. Wireless communication device 1100 may include other well-known components such as a battery and enclosure that are not shown for clarity. Wireless communication device 1100 may be a mobile phone, computer, e-book, mobile Internet appliance, media player, game console, wireless network interface card, or some other wireless communication apparatus—including variations or combinations thereof.

Wireless communication interface 1101 comprises at least an antenna and RF communication circuitry. The RF communication circuitry typically includes an amplifier, filter, RF modulator, and signal processing circuitry. Wireless communication interface 1101 may also include a memory device, software, processing circuitry, or some other communication device. Wireless communication interface 1101 may use various protocols, such as WiMAX, CDMA, CDMA2000, WCDMA EVDO, GSM, LTE, WIFI, HSPA, or some other wireless communication format to communicate wirelessly with base stations.

User interface 1102 comprises components that interact with a user to receive user inputs and to present media and/or information. User interface 1102 may include a speaker, microphone, buttons, lights, display screen, touch screen, touch pad, scroll wheel, communication port, or some other user input/output apparatus—including combinations thereof. User interface 1102 may be omitted in some examples.

Processing system 1103 may comprise a microprocessor and other circuitry that retrieves and executes software 1105 from storage system 1104. Storage system 1104 comprises a disk drive, flash drive, data storage circuitry, or some other memory apparatus. Processing system 1103 is typically mounted on a circuit board that may also hold storage system 1104 and portions of communication interface 1101 and user interface 1102. Software 1105 comprises computer programs, firmware, or some other form of machine-readable processing instructions. Software 1105 may include an operating system, utilities, drivers, network interfaces, applications, or some other type of software.

When executed by processing system 1103, software 1105 directs processing system 1103 to operate wireless communication device 1100 as described herein for wireless communication device 102.

In particular, software 1105, when executed by processing system 1103, directs processing system 1103 to obviate the effects of the above-noted vulnerability of the WiMAX communication technology by detecting when the vulnerability may expose the communication device to attacks and terminating communications accordingly.

Some or all of the actions performed by the exemplary embodiments described herein can be performed under the control of a computer system executing computer-readable codes embedded on a computer-readable recording medium or on communication signals transmitted through a transitory medium. The computer-readable recording medium may include any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The communication signals transmitted through a transitory medium may include, for example, signals which modulate carrier waves transmitted through wired or wireless transmission paths.

The above description and associated figures explain the best mode of the present teachings. Other embodiments will be apparent to those skilled in the art from consideration of the specification and practice of the teachings disclosed herein. It is intended that the specification and examples be considered as exemplary only, with a true scope and spirit present teachings being indicated by the following claims.

What is claimed is:

1. A method of accessing a communication system comprising:
   transmitting, by a communication device to a node of the communication system through a communication link between the communication device and the node, a request to negotiate basic radio resource control (RRC) capabilities for communicating with the node;

receiving, at the communication device from the node, a response message to the request to negotiate basic radio resource control capabilities, wherein the response message comprises a Non-access stratum (NAS) layer security mode command or an RRC attach accept message;

determining, at the communication device, that the communication system does not support authentication based on the response message, wherein the determination is made prior to receiving an authentication message; and transmitting, by the communication device to the node, a request to disconnect the communication link, when the response message indicates that the node does not support authentication.

2. The method of claim 1, wherein the request to negotiate basic RRC capabilities for communicating with the node comprises an attach request message and the request to disconnect the communication link comprises procedures based on the communication system failing an authentication check.

3. The method of claim 2, further comprising:

transmitting, by the communication device to the node, the request to disconnect the communication link, when receiving from the communication system the NAS layer security mode command before receiving an authentication request from the communication system.

4. The method of claim 2, further comprising:

transmitting, by the communication device to the node, the request to disconnect the communication link, when receiving from the communication system a radio resource control layer security mode command before receiving an authentication request from the communication system.

5. A communication device comprising:

a communication interface unit for communicating with a communication system over a connection link between the communication interface and a node of the communication system;

a storage unit; and a processor coupled to the communication interface and the storage unit configured to:

transmit, to the node, a request to negotiate basic radio resource control (RRC) capabilities for communicating with the communication system;

receive a response message to the request to negotiate basic RRC capabilities, wherein the response message comprises a Non-access stratum (NAS) layer security mode command or an RRC attach accept message;

determine that the communication system does not support authentication based on the response message, wherein the determination is made prior to receiving an authentication message; and transmit, to the node, a request to disconnect the communication link, when the response message indicates that the node does not support authentication.

6. The communication device of claim 5, wherein the request to negotiate basic RRC capabilities comprises an attach request message, the response message comprises the RRC attach accept message, and the request to disconnect the communication link comprises procedures based on the communication system failing an authentication check.

7. The communication device of claim 6, wherein the processor is further configured to:

transmit, to the node, the request to disconnect the communication link, when receiving from the communication system the NAS layer security mode command before receiving an authentication request from the communication system.

8. The communication device of claim 6, wherein the processor is further configured to:

transmit, to the node, the request to disconnect the communication link, when receiving from the communication system a radio resource control layer security mode command before receiving an authentication request from the communication system.

* * * * *